United States Patent [19]

Carlson

[11] Patent Number: 4,663,813
[45] Date of Patent: May 12, 1987

[54] METHOD OF MAKING AN INTERNAL WAVE GENERATOR FOR STRAIN WAVE GEARING

[75] Inventor: John H. Carlson, Danvers, Mass.

[73] Assignee: USM Corporation, Farmington, Conn.

[21] Appl. No.: 821,186

[22] Filed: Jan. 22, 1986

[51] Int. Cl.$^4$ ............................................. B23P 15/14
[52] U.S. Cl. ................................ 29/159.2; 74/606 R; 74/640; 74/804
[58] Field of Search .................... 29/159.2; 74/606 R, 74/640, 804; 418/150

[56] References Cited

U.S. PATENT DOCUMENTS

| | | | |
|---|---|---|---|
| 339,072 | 3/1886 | Nies | 269/303 |
| 1,347,671 | 7/1920 | Belshaw | 74/804 |
| 2,906,143 | 9/1959 | Musser | 29/159.2 |
| 2,959,065 | 11/1960 | Musser | 74/438 |
| 3,239,699 | 3/1966 | Ferrary | 74/640 |
| 3,461,997 | 8/1969 | Humphreys | 74/640 |

Primary Examiner—Percy W. Echols
Attorney, Agent, or Firm—Spencer T. Smith

[57] ABSTRACT

A method of making an elliptoidal internal journal type wave generator for use with a flexspline, the latter having internal spline teeth, an outer diameter (O.D.) designated two times the radius (R), and a radial deflection (d) for spline meshing at minor axis localities with diametrically opposed spline teeth of at least one rigid circular spline, the method comprising:

a. providing a circular wave generator ring with a radially inner wall diameter (I.D.) equal to twice R plus three times d, and a ring thickness 1.3 to 1.4 times the inner wall I.D.;

b. opening the ring by forming only one gap at least eight times d in circumferential dimension;

c. radially reducing the ring portion diametrically opposite to the gap to enhance radial flexibility of the ring while still enabling it to maintain its I.D. dimension;

d. compressing the ring along an axis perpendicular to a median through the gap and the reduced portion to circumferentially decrease the gap until permanent deformation occurs establishing a minor axis dimension in the ring corresponding to loose meshing of the spline teeth; and e. further closing the gap to selectively decrease the minor axis dimension to enable the ring to preload the spline teeth.

5 Claims, 6 Drawing Figures

METHOD OF MAKING AN INTERNAL WAVE GENERATOR FOR STRAIN WAVE GEARING

FIELD OF THE INVENTION

This invention relates to strain wave gearing, and more particularly to an improved method of making a journal type wave generator therefor.

PRIOR ART

As basically disclosed in U.S. Pat. No. 2,906,143 to Musser, a circumferential wave of radial deflection in a gearing element termed a flexspline is rotated for progressive reaction with a rigid circular spline. The radial deflection is commonly produced by a multilobed cam herein referred to as a wave generator and arranged coaxially often elliptoidal, may be of an external type wherein major axis localities of its outer circumference engage and radially deflect outwardly the wall of the flexspline to cause its spline teeth to mesh at such localities with the teeth of the cirucular spline. The wave generator with which this novel method is primarily concerned is said to be of "internal type", i.e., its minor axis localities impose the wave shape on the flexspline by radially inward deflection. Thus an internal wave generator is disposed outside of a flexspline to deflect internal spline teeth of the latter inwardly at its minor axis localities for meshing with a rigid circular spline disposed within the flexspline. Flexspline teeth not at the minor axis localities are out of meshing relation. An application of an internal wave generator is disclosed, for example, in U.S. Pat. No. 2,959,065 to Musser. In that instance an object was to provide precision in an infinite indexer, but it will be understood strain wave gearing employing internal wave generators may also be used for many other purposes. There arises, however, the need for special manufacturing technique in providing optimum configuration to internal wave generators. Important to their performance is the production of their elliptoidal shape to insure adjustability for proper preloading of the spline teeth, and to attaining exactness in the wave shape economically as appropriate to different sizes and deflections of splines. An early approach deliberately designed the minor axis dimension of the internal wave generator cam sufficient small to preload the teeth and effect zero backlash. This was abandoned due to difficulty then encountered in correctly adjusting the wave generator.

A later design of internal wave generator enlarged its minor axis dimension to eliminate spline preloading but then attained such loading by means of screws extending along the wave generator minor axis. Tightening the screws exerted a radial force on the flexspline outside diameter to preload the spline mesh theoretically, but in practice they then were often excessively tightened causing ends of the screws to be coined against the flexspline and damaging it. Next, a single screw for radially engaging a hub of the circular spline was tried; it could be safely used but it introduced backlash because preloading of the spline teeth, a condition often desirable, was eliminated. The present invention uses a deformed c-shape ring to provide a minor axis therein to effect deflection of the flexspline a prescribed amount. It is recognized that it is old to manufacture c-shaped or split collars to be secured to round rigid shafts and the like to provide a shoulder thereon, but such construction serves a wholly different and non-analogous function.

SUMMARY OF THE INVENTION

It is an object of this invention to provide an improved method for making an internal wave generator. More specifically it is an object of this invention to provide a novel manufacturing technique for making an internal working surface of the wave generator with a shape closely conforming to the flexspline outside diameter over wide angles along its minor axis and effective to preload the spline teeth to eliminate backlash when adjusted to its operating shape.

Knowing that the true elliptoidal shape of the generator can be expressed mathematically in terms of the non-deflected flexspline outside diameter and its clearance with the wave generator, the radius of curvature in the vicinity of the minor axis of the wave generator can be expressed as a function of the sum of half the flexspline O.D. (designed R) plus one and one-half times the flexspline radial deflection (designated d). Such curvature desirably approximates the wave shape over a 60° segment at the minor axis, and beyond that segment the constant radius separates from the flexspline O.D. with increasing clearance. Advantage is taken of this fact from a manufacturing standpoint by first turning the I.D. of a circular ring of radius R and deflection d to a diameter equal to 2R plus 3d; then removing material to form a gap, at what is to become a major axis locality of the ring, equal to at least eight times d, and radially reducing the ring wall diametrically opposite to the gap to enhance radial flexibility. Now, compression is applied to the ring along an axis perpendicular to a median through the gap and the reduced portion until permanent "deformation" occurs at the reduced portion, but retaining the curvature in the rmainder of the ring, to establish a minor axis dimension corresponding to loose meshing of the flexspline and circular spline teeth. Lastly, a means such as a screw is provided across the gap for adjustably closing it to selectively modify the minor axis dimension for preloading the spline teeth. A major benefit of this procedure is that it permits the turning to be done on a conventional lathe rather than necessitating production of a wave generator with initially precise major and minor axes.

Material of the ring of the opposite side from the gap may be slotted or otherwise treated (either inside or outside of the ring) to lend sufficient flexibility to the c-shaped ring to facilitate additional deflection by means of the adjusting screw to preload the spline mesh. However, adequate stiffness should be retained to impose a deflection wave within the flexspline to maintain a loose spline engagement with the circular splines along the minor axis.

BRIEF DESCRIPTION OF THE DRAWINGS

The method of making a preferred embodiment of the invention will now be more particularly illustrated and described with reference to the accompanying drawings, in which.

DESCRIPTION OF PREFERRED EMBODIMENT

Figure 4:
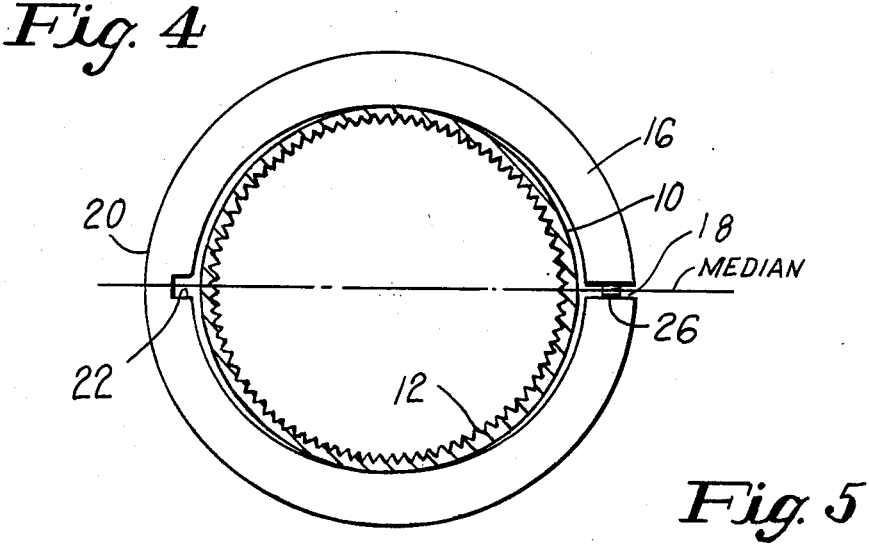
FIG. 4 is a view similar to FIG. 3 but with the deflected flexspline inserted and an untightened adjusting screw bridging the gap.
Figure 5:
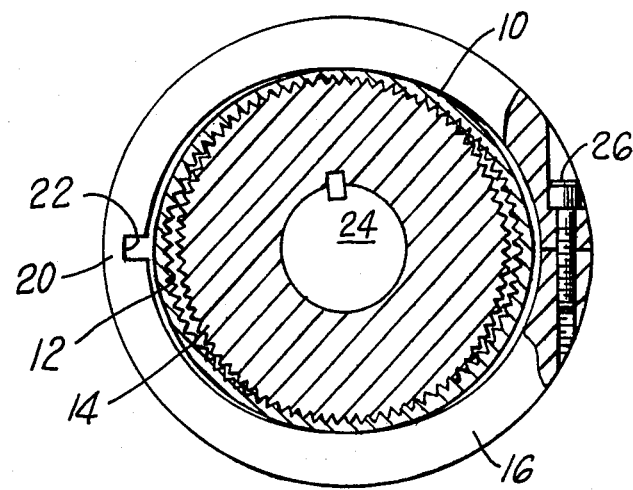
FIG. 5 is a view similar to FIG. 4 but illustrating the adjusting screw tightened to preload the teeth of the flexspline along the minor axis of those of a circular spline.

It is assumed that a circular flexible spline 10 (to be elliptoidally deflected a shown in FIGS. 4 and 5) has an O.D. of 2R, and a circumferential wave of radial deflection designated d is required to be imparted to the flexible spline 10 by a journal type internal wave generator. The method of making this wave generator, now to be explained, is critical to attaining proper meshing and clearance of internal teeth 12 of the flexible spline with external spline teeth of a coaxial, rigid circular spline 14 (FIG. 5).

Figure 1:
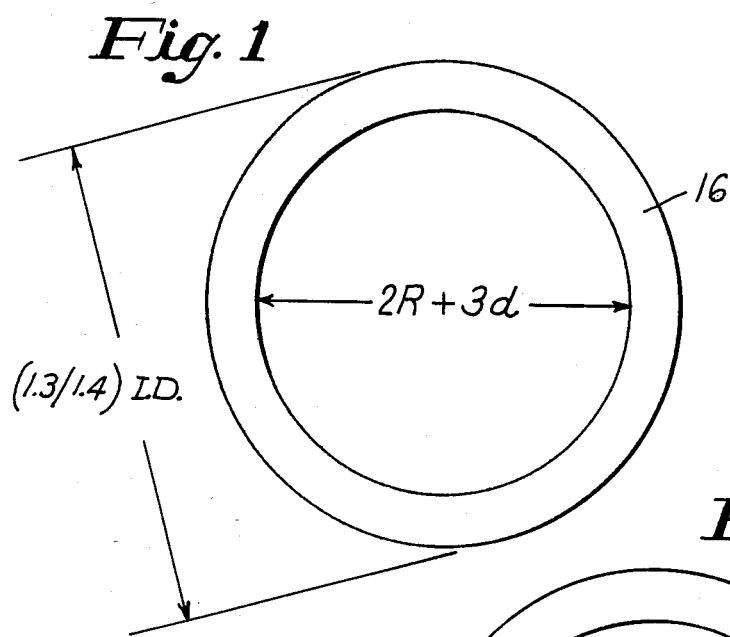
FIG. 1 is a view of a circular ring the bore wall of which, in subsequent steps, is to be deflected to selected elliptoidal wave generating shape.

The initial step in the method is to provide a circular ring 16 (FIG. 1) having a bore diameter equal to twice the radius R plus three times the deflection d. This dimensional relation of the wave generator ring bore to the flexible O.D. has been determined advantageous since then the radius of curvature of the wave generator, when deflected 1.5 times d provides a wave shape closely approximating the deflected flexspline curvature over a 60° segment at the minor axis localities as indicated in FIG. 5. The O.D. of the ring 16 is desirably taken on the order of 1.3 to 1.4 times (i.e. 15–20% of) its internal diameter thereby providing suitable strength and resilience yet allowing it to be elliptoidally shaped when "deformed", i.e. deflected from circular configuration as next described.

Figure 2:
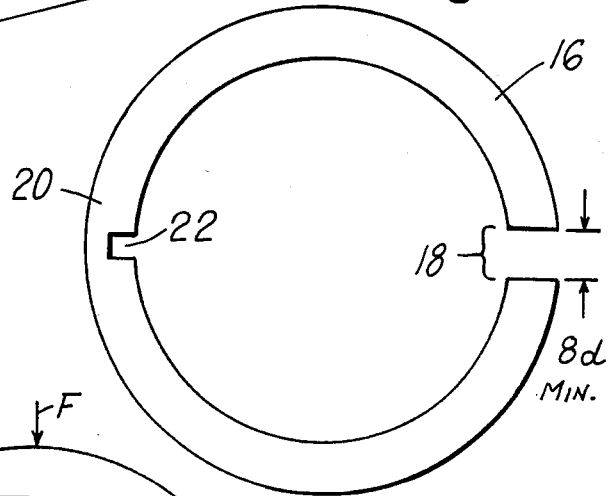
FIG. 2 is a view of the non-deflected ring, similar to FIG. 1, but with diametrically opposite portions removed to form a radially deflectable c-shape.

Internal elliptoidal wave shape could be introduced into the ring 16 by removing diametrically opposite material therefrom to form two complemental "halves", the circumferential dimension of the material taken from each side then being equal to four times d. The "halves" when reassembled and secured could then have a correct minor axis dimension of two times R minus d for conforming the flexspline 10 over an arc of about 60° and providing adequate major axis clearance. Because of lack of adjustability and other factors, however, this "halving" is not usually a preferred method of this invention. Instead, as shown in FIG. 2, it is preferred to maintain the wave generator 16 as a single c-shaped piece by forming a radial gap 18 in one side only of the ring, and reducing a portion 20 diametrically opposite from the gap, for instance by forming a slot 22, to constitute a hinging locality within the ring which becomes permanently deformed when thereafter a compression force is applied to produce the desired minor axis dimension.

The circumferential dimension of the gap 18 (exaggeratedly shown) is at least eight times d when formed in the non-deflected ring 16 to still attain the extended spline meshing. In lieu of the internal slot 22 shown, external material on the side of the ring opposite to the gap could be removed, if desired, to provide the desired flexibility. The radial width of the slot 22 is approximately four times d or about 5% of the ring I.D.

Figure 3:
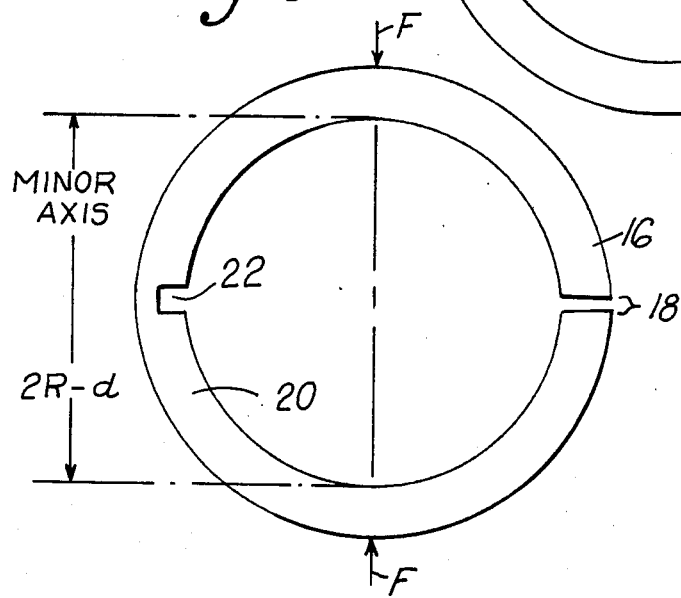
FIG. 3 is a view of the ring of FIG. 2 but showing a compressive force applied perpendicular to a median through the reduced portions until yielding and permanent radial "deformation" has occurred to the ring.

Now the c-shaped ring 16 is comprssed by forces F (FIG. 3) acting perpendicular to a median through the gap 18 and the reduced portion 20 until yielding and permanent "deformation" (i.e. radial deflection) occurs, diminishing the gap 18 and establishing a minor axis dimension and circular splines in the minor axis localities. As indicated in FIG. 4 the flexspline 10 may now be coaxially mounted in the deformed or deflected wave generator, and there is radial clearance between them in the localities of the median extending through the gap 18 and the portion 20. It will be understood that with the compression applying means removed the flexspline 1 and the rigid circular spline 14, in loose meshing relation, are axially receivable in, and demountable from the deflected wave generator at this stage. To selectively further modify the minor axis dimension thus to effect preloading of the spline teeth, means, for example a screw 26 (FIGS. 4, 5) is threadedly received in the wave generator and extends perpendicularly to the median through the gap and the reduced portion 22 and across the gap 18. As FIG. 5 shows, the gap 18 that had been reduced by compression (comparing FIG. 2 with FIGS. 3 and 4) is further diminished by tightening the screw substantially to close the gap and preload the spline teeth. When the teeth are thus preloaded to eliminate backlash the rigid circular spline 14 remains out of meshing relation with the flexspline teeth 12 at major axis localities of the flexspline. It will be apparent that relative rotation of the screw in the wave generator causes the latter to bend about the locality 20 and thus appropriately modify the elliptoidality of the generator.

Figure 6:
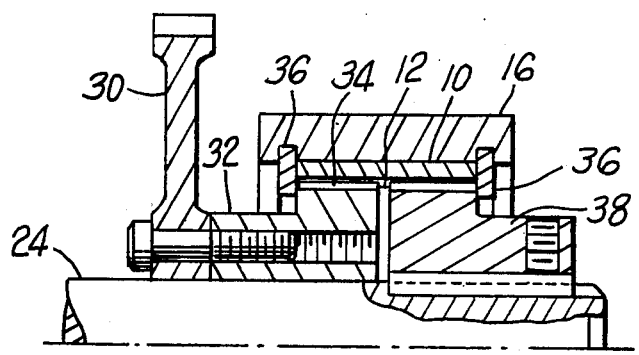
FIG. 6 is an axial sectional view of an illustrative strain wave drive or rotary adjustment device embodying a wave generator made according to the method of this invention.

Referring lastly to FIG. 6, the wave generator 16 made by the method above described is shown as adapted for use in an illustrative device. As in strain wave gearing generally, the device may be reversible in operation. It is here assumed that a shaft 24 to whichs the rigid spline 14 is keyed provides output, and input is via a gear 30 journalled thereon. Bolted to the hub of the gear 30 for rotation therewith is a rigid circular spline 32. Spline 34 of the spline 32 differ in number (by two or a multiple thereof) from the internal spline teeth 12 of the flexspline 10. The latter is held axially by spaced snap rings 36, 36 respectively inserted in grooves of the wave generator. Also meshing with the flexspline teeth 12 is a rigid circular spline 38 keyed to the shaft 24 and having the same number of teeth as the teeth 12. It will be understood that with the adjusting screw 26 (not shown in FIG. 6) tightened the entire assembly is locked together and the gear 30 and shaft 24 will rotate in unison. However, to effect a phase shift between the gear 30 and shaft 24 the assembly is stopped, adjusting screw 26 is loosened and the wave generator 16 is rotated. The ratio between the wave generator rotation and phase shift is determined by the number of teeth on the circular splines and tooth differential with the flexspline. The ratio is typically 100/1 but could be 10,000/1 if desired. When the desired phase shift is achieved the adjusting screw is tightened and the assembly is ready for operation in its new position.

In the arrangement described one (or the other) of the pair of rigid coaxial circular splines provides reaction torque, and adjusting means, such as the screw (26) (not shown in FIG. 6) is used to cause the preloading of the teeth. The sequence of steps mentioned above for making the wave generator 16 and imparting to it its elliptoidal wave shape assures improved operating performance. This follows from the extended spline meshing at the minor axis localities with adequate clearance of the spline teeth along major axis localities. Moreover utilization in the method of compressive force permanently to "deform", i.e. deflect the initially circular bore of the c-shaped piece to provide the minor axis dimension corresponding to loose meshing of the spline teeth enables convenient assembly followed by the last step, the adjustment of the screw 26, to refine loading of the splines as appropriate to eliminate backlash. Both cost and performance advantages are considered to flow from the use of wave generators made by the method herein described.

What is claimed is:

1. The method of making an elliptoidal internal journal type wave generator for use with a flexspline, the latter having internal spline teeth, an outer diameter (O.D.) designated two times the radius (R), and a radial deflection (d) for spline meshing at minor axis localities with diametrically opposed spline teeth of at least one rigid circular spline, the method comprising:
   a. providing a circular wave generator ring with a radially inner wall diameter (I.D.) equal to twice R plus three times d, and a ring thickness 1.3 to 1.4 times the inner wall I.D.;
   b. opening the ring by forming only one gap at least eight times d in circumferential dimension;
   c. radially reducing the ring portion diametrically opposite to the gap to enhance radial flexibility of the ring while still enabling it to maintain its I.D. dimension;
   d. compressing the ring along an axis perpendicular to a median through the gap and said reduced portion to circumferentially decrease the gap until permanent deformation occurs establishing a minor axis dimension in the ring corresponding to loose meshing of the spline teeth; and
   e. lastly, further closing the gap to selectively decrease said minor axis dimension to enable the ring to preload the spline teeth.

2. The method of claim 1 wherein the circumferential dimension of the gap is initially formed slightly more than eight times d.

3. The method of claim 1 wherein, in step c, the radially inner wall is slotted.

4. The method of claim 1, wherein in step d, a threaded means is manually operated to draw the gap to its further closed position.

5. The method of making an elliptoidal internal journal type wave generator for circumferentially imparting a wave of radial deflection d in strain wave gearing to a flexible spline of outside diameter designated two times its radius R when non-deflected, the method comprising:
   a. forming the axial bore of a ring with a diameter equal to twice R plus three times d, and a wall thickness 15-20% of the ring bore diameter;
   b. forming a gap in the ring wall to provide a c-shaped ring with confronting sides of the gap spaced apart slightly more than eight times d as measured circumferentially;
   c. enhancing radial flexibility of the ring about a ring portion located about 180° from said gap;
   d. deflecting the ring about said ring portion and thus closing said gap to a dimension corresponding to a minor axis dimension in the c-ring of twice R minus d, and finally;
   e. further decreasing the gap to cause its sides substantially to abut and the ring to engage the minor localities of the flexspline while spaced from its major axis localities.

* * * * *